J. W. Foster,
Hand Stamp.

No 1871. Reissued Feb 14 1865

James H. Gidley
J. Schnerlin.

J. W. Foster
By Munn & Co
Attys

UNITED STATES PATENT OFFICE.

JOHN W. FOSTER, OF WASHINGTON, DISTRICT OF COLUMBIA.

CANCELING-STAMP.

Specification forming part of Letters Patent No. 45,708, dated January 3, 1865; Reissue No. 1,871, dated February 14, 1865.

*To all whom it may concern:*

Be it known that I, JOHN W. FOSTER, of the city and county of Washington, in the District of Columbia, have invented a new and Improved Canceling-Stamp; and I do hereby declare the following to be a full and exact description of the same, reference being had to the accompanying drawings, making part of this specification, in which—

Figure 1:
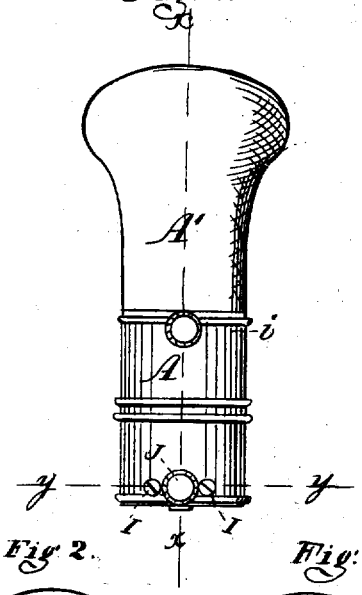
Figure 2:
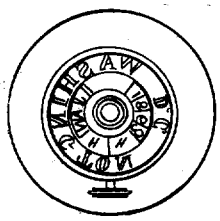
Figure 4:
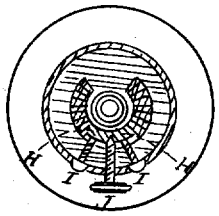
Figure 5:
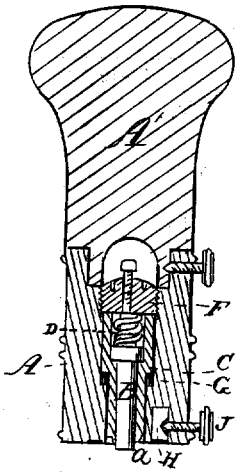
Figure 3:
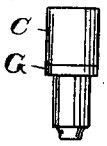

Figure 1 is a side elevation of my improved stamp. Fig. 2 is a face or end view thereof. Fig. 3 is a longitudinal central section in the line *x x*. Fig. 4 is a transverse section of the line *y y*. Fig. 5 is a detached view exhibiting in elevation the annular cutter or punch hereinafter referred to.

Similar letters of reference indicate corresponding parts in the several figures.

This invention relates to a canceling-stamp which is chiefly designed to constitute a medium whereby postage and other stamps may be effectually defaced by being cut or punched in such a way that an attempt to detach the stamp from the envelope to which it is applied will invariably produce the separation or detachment from said stamp of the portion which has been cut out by the knife or leave an ineffaceable mark therein. This cutting or punching of a stamp, if the latter be the object to be so cut or punched, may be effected after it has been applied to the envelope without the latter being penetrated or its contents injured.

The invention consists in a novel manner of gaging the cutting-instrument so as to limit the depth of its penetration, as will be hereinafter fully described. Also, in a novel manner of locking type in the stamp.

In order that others skilled in the art to which my invention appertains may be enabled to fully understand and use the same, I will proceed to describe its construction and operation.

In the accompanying drawings, A represents a metallic casing or socket, within which is fitted an annular cutter or punch, C. B is an adjustable gage fitted to slide longitudinally within the punch C, and pressed outward by a spiral spring, D. E is a set-screw, limiting the distance to which the gage B may be pressed in while in use.

This stamp may be provided with a handle, A′, and operated by hand, or it may be used in a lever, steam, or other press. In using it the internal gage, B, strikes the surface of the paper first and recedes until its upper end comes against the set-screw E. The gage then arrests the further penetration of the punch C, and thus limits the depth to which it can cut.

By regulating the retraction of the gage B by the adjustment of the set-screw E the punch may be made to cut through one, two, or more thicknesses of paper, as desired, with the greatest accuracy, or even to produce an ineffaceable mark on the paper without penetrating a single thickness. It is therefore of great value in its application as a postage-stamp canceler, as with a proper adjustment of the gage the punch may be made to effectually destroy the postage-stamp without a possibility of injuring the contents of the envelope or even penetrating the envelope itself.

F is a set-nut, against which the upper end of the punch C is made to bear, and which provides means for adjusting the punch itself. This nut may be used in connection with or instead of the adjustment of the gage B. The adjustment of the nut F will regulate the distance to which the ground C projects beyond the face *a* of the casing A, and thus limit the penetration of the punch.

G represents an annular gum-elastic spring, which, while permitting the adjustment of the punch, constantly forces the latter upward against the set-nut F, and thus retains it in an immovable condition after adjustment. Either mode of adjustment may be used without the other, or they may be used together. In the latter case, however, it is needful to maintain the adjustment of the gage B relatively to the punch C, and for this purpose the set-screw E of the gage is made to work in the set-nut F of the punch.

It is apparent that the gage B, on assuming its normal position after it has been forced upward when the stamp is in operation, will eject any paper that may have lodged within the punch. The adjustment of the punch may also be made to compensate for the wear thereof.

Any suitable lettering or device may be engraved on the face *a* of the casing A, and movable type may be set in an annular cavity within the face *a*, said type being encircled by the engraved lettering, as shown in Fig. 2. To adapt the type to be changed and a larger or smaller number of them to be inserted, as well as to enable them to be properly locked, I employ adjustable metallic blocks H H, which are retained within the type-cavity by screws I I, but which, having slots H H for the reception of the ends of the screws, are free to move around within the type-cavity away from each other, or to be moved in contact with each other, as represented in the drawings. This adjustment of the blocks H H away from each other may be effected with facility by means of a thumb-screw, J, which passes through the wall of the casing A. The point of the screw J is conical, and the two contiguous surfaces of the blocks H H are so formed as to receive the point of the screw between them when they are in contact with each other. Hence when the screw J is turned it acts as a wedge and forces the blocks apart until they properly lock the type, which may be set up within the cavity.

I do not limit myself to any prescribed form of knife or gage, or any specific means for adjusting the one in relation to the other.

Having thus described my invention, the following is what I claim as new therein and desire to secure by Letters Patent:

1. A canceling-stamp provided with an annular cutter, C, and an internal gage, B, either one or both adjustable in relation to each other, substantially as and for the purposes set forth.

2. The combination of the double set-screws E F with the cutter C and gage B, for the purpose specified.

3. The adjustable blocks H H, operated by the screw J, and employed to lock the type of the stamp, substantially as set forth.

JNO. W. FOSTER.

Witnesses:

ALEXR. A. C. KLAUCKE,
EDWARD H. KNIGHT.